(12) United States Patent
Li et al.

(10) Patent No.: US 12,528,158 B2
(45) Date of Patent: Jan. 20, 2026

(54) ABRASIVE ARTICLE AND METHOD OF MAKING THE SAME

(71) Applicant: 3M INNOVATIVE PROPERTIES COMPANY, St. Paul, MN (US)

(72) Inventors: Junting Li, Woodbury, MN (US); Jing Zhang, Minneapolis, MN (US); Kui Chen-Ho, Woodbury, MN (US); Michael J. Annen, Hudson, WI (US); Yuyang Liu, St. Paul, MN (US); Ann M. Gilman, Bayport, MN (US); Kevin T. Reddy, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 411 days.

(21) Appl. No.: 18/005,815

(22) PCT Filed: Jul. 7, 2021

(86) PCT No.: PCT/IB2021/056099
§ 371 (c)(1),
(2) Date: Jan. 17, 2023

(87) PCT Pub. No.: WO2022/023845
PCT Pub. Date: Feb. 3, 2022

(65) Prior Publication Data
US 2023/0278170 A1 Sep. 7, 2023

Related U.S. Application Data

(60) Provisional application No. 63/058,832, filed on Jul. 30, 2020.

(51) Int. Cl.
*B24D 11/00* (2006.01)
*B24D 3/00* (2006.01)
*B24D 3/28* (2006.01)

(52) U.S. Cl.
CPC ............ *B24D 11/001* (2013.01); *B24D 3/004* (2013.01); *B24D 3/007* (2013.01); *B24D 3/28* (2013.01)

(58) Field of Classification Search
CPC .......... B24D 3/28; B24D 3/007; B24D 3/004; B24D 11/001
See application file for complete search history.

(56) References Cited

U.S. PATENT DOCUMENTS 1,910,444 A   5/1933  Nicholson
3,041,156 A   6/1962  Rowse et al.
(Continued)

FOREIGN PATENT DOCUMENTS

WO   2012112305 A2   8/2012
WO   2015100018 A1   7/2015
(Continued)

OTHER PUBLICATIONS

International Search Report received for PCT International Application No. PCT/IB2021/056099, mailed on Oct. 19, 2021, 4 pages.

*Primary Examiner* — Pegah Parvini
(74) *Attorney, Agent, or Firm* — Kathleen B. Gross; Bradford B. Wright; Katherine M. Scholz (57) ABSTRACT

An abrasive article comprises a porous substrate having openings extending through the porous substrate between first and second opposed major surfaces. An abrasive coating is disposed on only a portion of a first major surface of the porous substrate. The abrasive coating comprises a functional layer disposed on only a portion of a first major surface of the porous substrate, a make layer disposed on at least a portion of the functional layer opposite the porous substrate, and abrasive particles. The functional layer and the make layer independently comprise chemically cross-linked binders. The functional layer fully occludes a first portion the openings and does not fully occlude a second (Continued)

portion of the openings, which permits passage of abraded swarf through the abrasive article. Methods of making the abrasive article are also disclosed.

20 Claims, 4 Drawing Sheets

(56) References Cited

U.S. PATENT DOCUMENTS

| | | |
|---|---|---|
| 4,314,827 A | 2/1982 | Leitheiser et al. |
| 4,623,364 A | 11/1986 | Cottringer et al. |
| 4,652,274 A | 3/1987 | Boettcher et al. |
| 4,652,275 A | 3/1987 | Bloecher et al. |
| 4,744,802 A | 5/1988 | Schwabel |
| 4,751,138 A | 6/1988 | Tumey et al. |
| 4,770,671 A | 9/1988 | Monroe et al. |
| 4,799,939 A | 1/1989 | Bloecher et al. |
| 4,881,951 A | 11/1989 | Wood et al. |
| 4,903,440 A | 2/1990 | Larson et al. |
| 4,985,340 A | 1/1991 | Palazzotto et al. |
| 4,997,461 A | 3/1991 | Markhoff-Matheny et al. |
| 5,009,675 A | 4/1991 | Kunz et al. |
| 5,011,508 A | 4/1991 | Wald et al. |
| 5,042,991 A | 8/1991 | Kunz et al. |
| 5,085,671 A | 2/1992 | Martin et al. |
| 5,086,086 A | 2/1992 | Brown-Wensley et al. |
| 5,152,917 A | 10/1992 | Pieper et al. |
| 5,201,916 A | 4/1993 | Berg et al. |
| 5,213,591 A | 5/1993 | Celikkaya et al. |
| 5,236,472 A | 8/1993 | Kirk et al. |
| 5,352,254 A | 10/1994 | Celikkaya |
| 5,366,523 A | 11/1994 | Rowenhorst et al. |
| 5,376,428 A | 12/1994 | Palazzotto et al. |
| 5,385,954 A | 1/1995 | Palazzotto et al. |
| 5,435,816 A | 7/1995 | Spurgeon et al. |
| 5,556,437 A | 9/1996 | Lee et al. |
| RE35,570 E | 7/1997 | Rowenhorst et al. |
| 5,672,097 A | 9/1997 | Hoopman |
| 5,946,991 A | 9/1999 | Hoopman |
| 5,975,987 A | 11/1999 | Hoopman et al. |
| 5,984,988 A | 11/1999 | Berg et al. |
| 6,129,540 A | 10/2000 | Hoopman et al. |
| 7,037,100 B2 | 5/2006 | Strobel et al. |
| 8,034,137 B2 | 10/2011 | Erickson et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,216,030 B2 | 7/2012 | Hoglund |
| 9,138,031 B2 | 9/2015 | Wood et al. |
| 9,168,636 B2 | 10/2015 | Wald et al. |
| 9,771,504 B2 | 9/2017 | Adefris |
| 2006/0148390 A1 | 7/2006 | Woo et al. |
| 2007/0028525 A1* | 2/2007 | Woo .............. B24D 11/02 451/526 |
| 2007/0028526 A1 | 2/2007 | Woo et al. |
| 2008/0153407 A1 | 6/2008 | Rambosek et al. |
| 2009/0165394 A1 | 7/2009 | Culler et al. |
| 2009/0169816 A1 | 7/2009 | Erickson et al. |
| 2009/0325466 A1* | 12/2009 | Kincaid .............. B24D 3/20 451/28 |
| 2011/0065362 A1 | 3/2011 | Woo et al. |
| 2011/0159794 A1 | 6/2011 | Chung-Fat et al. |
| 2012/0227333 A1 | 9/2012 | Adefris et al. |
| 2013/0040537 A1 | 2/2013 | Schwabel et al. |
| 2013/0125477 A1 | 5/2013 | Adefris |
| 2016/0009048 A1 | 1/2016 | Slama et al. |
| 2019/0275641 A1 | 9/2019 | Nienaber et al. |

FOREIGN PATENT DOCUMENTS

| | | |
|---|---|---|
| WO | 2015100020 A1 | 7/2015 |
| WO | 2015100220 A1 | 7/2015 |
| WO | 2015168229 A1 | 11/2015 |
| WO | 2016028683 A1 | 2/2016 |
| WO | 2016089675 A1 | 6/2016 |
| WO | 2016205133 A1 | 12/2016 |
| WO | 2016205267 A1 | 12/2016 |
| WO | 2017007703 A1 | 1/2017 |
| WO | 2017007714 A1 | 1/2017 |
| WO | 2018063958 A1 | 4/2018 |
| WO | 2018063960 A1 | 4/2018 |
| WO | 2018063962 A1 | 4/2018 |
| WO | 2018080703 A1 | 5/2018 |
| WO | 2018080704 A1 | 5/2018 |
| WO | 2018080705 A1 | 5/2018 |
| WO | 2018080755 A1 | 5/2018 |
| WO | 2018080756 A1 | 5/2018 |
| WO | 2018080765 A1 | 5/2018 |
| WO | 2018080784 A1 | 5/2018 |
| WO | 2018080799 A1 | 5/2018 |
| WO | 2018118688 A1 | 6/2018 |
| WO | 2018118690 A1 | 6/2018 |
| WO | 2018118699 A1 | 6/2018 |
| WO | 2018134732 A1 | 7/2018 |
| WO | 2018136268 A1 | 7/2018 |
| WO | 2018136269 A1 | 7/2018 |
| WO | 2018136271 A1 | 7/2018 |
| WO | 2019102312 A1 | 5/2019 |
| WO | 2019102328 A1 | 5/2019 |
| WO | 2019102329 A1 | 5/2019 |
| WO | 2019102330 A1 | 5/2019 |
| WO | 2019102331 A1 | 5/2019 |
| WO | 2019102332 A1 | 5/2019 |
| WO | 2019111212 A1 | 6/2019 |
| WO | 2019111215 A1 | 6/2019 |
| WO | 2020084483 A1 | 4/2020 |
| WO | 2020099969 A1 | 5/2020 |
| WO | 2020100084 A1 | 5/2020 |
| WO | 2020128716 A1 | 6/2020 |
| WO | 2020128717 A1 | 6/2020 |
| WO | 2020128719 A1 | 6/2020 |
| WO | 2020128720 A2 | 6/2020 |
| WO | 2020128752 A1 | 6/2020 |
| WO | 2020128833 A1 | 6/2020 |
| WO | 2020128838 A1 | 6/2020 |
| WO | 2020128842 A1 | 6/2020 |
| WO | 2020128844 A1 | 6/2020 |
| WO | 2020128845 A1 | 6/2020 |
| WO | 2020128852 A1 | 6/2020 |
| WO | 2020128853 A1 | 6/2020 |
| WO | 2020128854 A1 | 6/2020 |
| WO | 2020128857 A1 | 6/2020 |
| WO | 2020165709 A1 | 8/2020 |
| WO | 2021116882 A1 | 6/2021 |
| WO | 2021234540 A1 | 11/2021 |

* cited by examiner

*FIG. 6*

ABRASIVE ARTICLE AND METHOD OF MAKING THE SAME

CROSS REFERENCE TO RELATED APPLICATIONS

This application is a national stage filing under 35 U.S.C. 371 of PCT/IB2021/056099, filed Jul. 7, 2021, which claims the benefit of U.S. Provisional Application No. 63/058,832, filed Jul. 30, 2020, the disclosure of which is incorporated by reference in its/their entirety herein.

BACKGROUND

Coated abrasive articles have an abrasive layer secured to a substrate. The substrate may be porous or non-porous. Examples of coated abrasive discs include sandpaper, abrasive discs, and abrasive belts.

It is common for dry sanding operations to generate a significant amount of airborne dust. To minimize this airborne dust, it is known to use porous abrasive articles on a tool while vacuum is drawn through the abrasive article, from the abrasive side through the backside of the article, and into a dust-collection system. For this purpose, many film-backed abrasive discs are available with perforations added to facilitate vacuum dust extraction.

As an alternative to converting dust-extraction holes into abrasive discs, commercial products also exist in which the abrasive layer is coated onto a porous knit fabric having loops integrally formed on one side as part of the porous knit fabric. The loops serve as one part of a hook-and-loop attachment system for attachment to a power tool.

SUMMARY

There is a continuing need for new coated abrasive products that provide enhanced cut and/or life performance while demonstrating superior dust extraction.

The present disclosure provides a combination of benefits (dust extraction combined with cut and/or useful life) by pattern-coating a functional layer on a portion of a major surface of a porous substrate, and then disposing an abrasive layer on the patterned functional layer. A patterned abrasive layer can therefore be designed independent of any pattern present on the porous substrate, to balance abrasive performance and dust extraction.

In one aspect, the present disclosure provides an abrasive article comprising:
  a porous substrate having openings extending through the porous substrate between first and second opposed major surfaces;
  an abrasive coating disposed on only a portion of a first major surface of the porous substrate, wherein the abrasive coating comprises:
  a functional layer disposed on only a portion of a first major surface of the porous substrate, wherein the functional layer comprises a first chemically crosslinked binder, wherein the functional layer fully occludes a first portion of the openings and does not fully occlude a second portion of the openings;
  a make layer disposed on at least a portion of the functional layer opposite the porous substrate, wherein the make layer comprises a second chemically crosslinked binder composition; and
  abrasive particles dispersed in or partially embedded in the make layer,
  wherein the second portion of the openings permits passage of abraded swarf through the abrasive article.

In some embodiments, the abrasive article further comprises one part of a two-part hook and loop attachment system secured to the porous substrate opposite the functional layer.

In another aspect, the present disclosure provides a method of making an abrasive article, the method comprising:
  providing a porous substrate having openings extending through the porous substrate between first and second opposed major surfaces;
  disposing a crosslinkable functional layer precursor on the first major surface of the porous substrate, wherein the crosslinkable functional layer precursor fully occludes a first portion of the openings and does not fully occlude a second portion of the openings;
  crosslinking the crosslinkable functional layer precursor to provide a crosslinked functional layer;
  disposing a curable make layer precursor on at least a portion of the crosslinked functional layer opposite the porous substrate, wherein the curable make layer precursor has abrasive particles dispersed therein;
  and at least partially curing the curable make layer precursor,
  wherein the second portion of the openings permits passage of abraded swarf through the abrasive article.

In yet another aspect, the present disclosure provides a method of making an abrasive article, the method comprising:
  providing a porous substrate having openings extending through the porous substrate between first and second opposed major surfaces;
  disposing a crosslinkable functional layer precursor on the first major surface of the porous substrate, wherein the crosslinkable functional layer precursor fully occludes a first portion of the openings and does not fully occlude a second portion of the openings;
  crosslinking the crosslinkable functional layer precursor to provide a crosslinked functional layer;
    disposing a curable make layer precursor on at least a portion of the crosslinked functional layer opposite the porous substrate;
  partially embedding abrasive particles in the curable make layer precursor;
  at least partially curing the curable make layer precursor to provide a make layer;
  disposing a curable size layer precursor over at least a portion of the make layer and the abrasive particles; and
  at least partially curing the curable size layer precursor to provide the abrasive article,
  wherein the second portion of the openings permits passage of abraded swarf through the abrasive article.

Features and advantages of the present disclosure will be further understood upon consideration of the detailed description as well as the appended claims.

It should be understood that numerous other modifications and embodiments can be devised by those skilled in the art, which fall within the scope and spirit of the principles of the disclosure. The figures may not be drawn to scale.

DESCRIPTION

Figure 1:
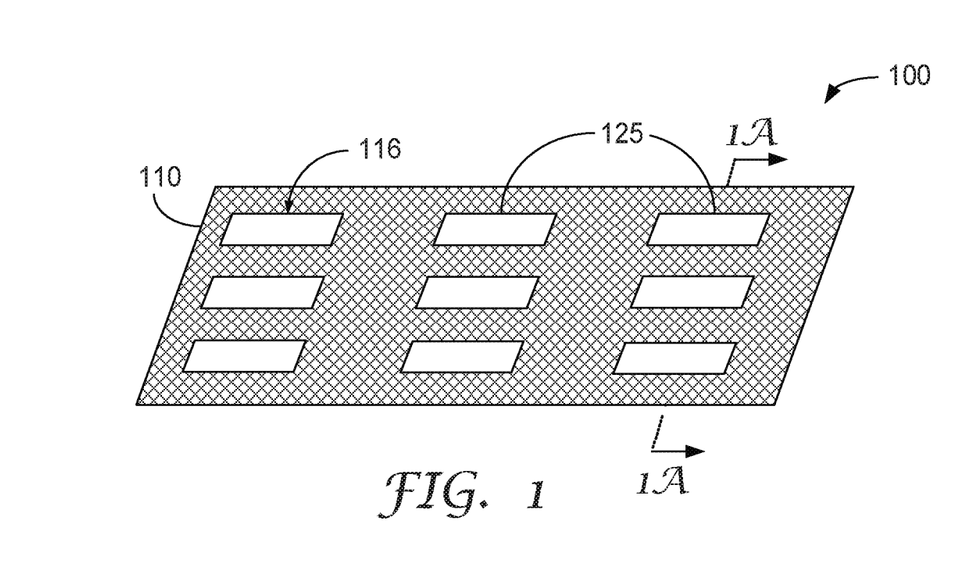
FIG. 1 is a schematic perspective view of an exemplary abrasive article 100 according to the present disclosure.

An exemplary embodiment of an abrasive article according to the present disclosure is depicted in FIG. 1. Referring now to FIG. 1, exemplary abrasive article 100 has porous substrate 110 (shown as a mesh) having first and second opposed major surfaces 112, 114. First major surface 112 has abrasive coating 116 disposed on only a portion of the porous substrate according to a predetermined pattern 125.

Figure 1A:
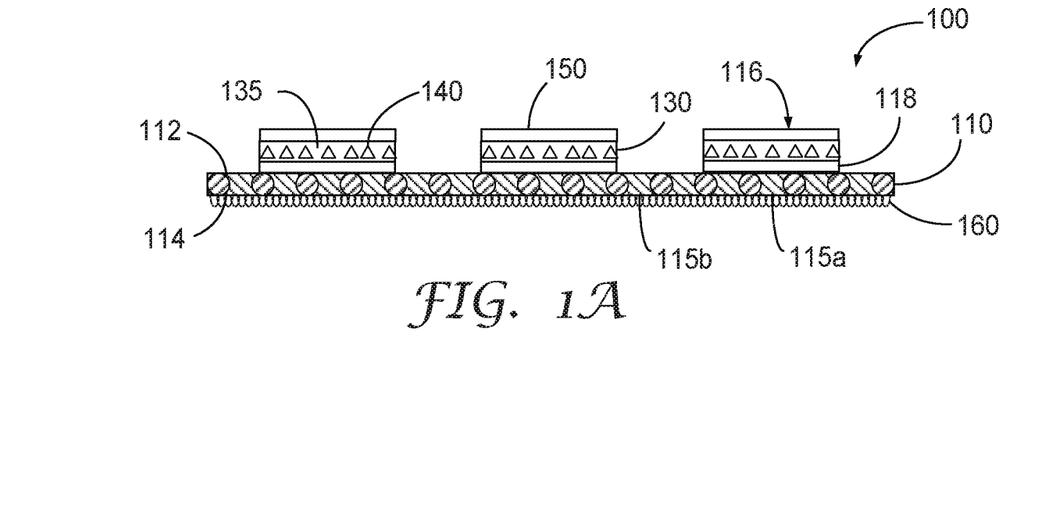
FIG. 1A is a schematic cross-sectional side view of abrasive article 100 along line 1A-1A.

As shown in FIG. 1A, porous substrate 110 has a first portion of openings 115a that extend therethrough the abrasive article and are fully occluded by functional layer 118, preventing swarf from passing through those openings. For a second portion of openings 115b, the openings are not fully occluded, thereby allowing swarf to pass through those openings. The abrasive coating comprises functional layer 118 and make layer 130 which is disposed on the functional layer. Make layer 130 includes abrasive particles 140 dispersed in a crosslinked binder composition 135. Optional supersize layer 150 overlays make layer 130.

Optional attachment interface layer 160, secured to the second major surface of the porous substrate, comprises one half of a two-part mechanical fastening system, shown as a looped portion of a hook and loop fastening system. The optional attachment interface layer may comprise one half of any two-part mechanical fastening system including, for example, hook and loop fastening systems and mushroom-stem web mechanical fasteners.

Figure 2:
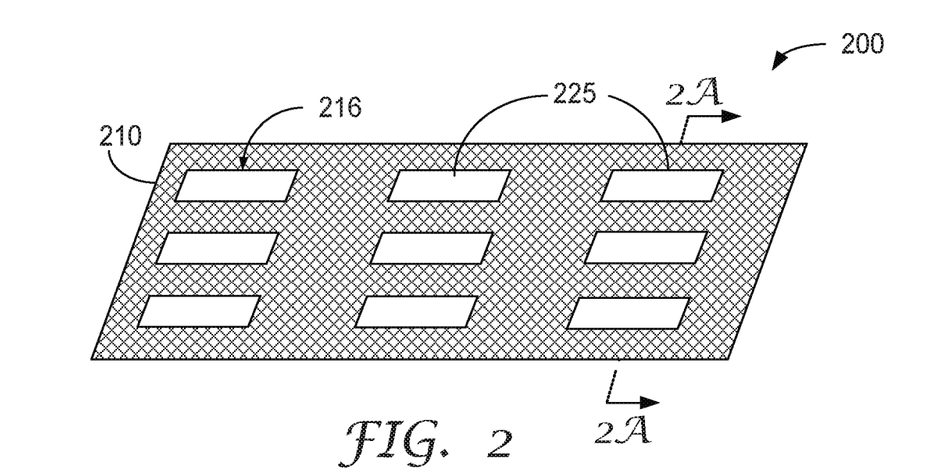
FIG. 2 is a schematic perspective view of an exemplary abrasive article 100 according to the present disclosure.

An exemplary embodiment of an abrasive article according to the present disclosure is depicted in FIG. 2. Referring now to FIG. 2, exemplary abrasive article 200 has porous substrate 210 having first and second opposed major surfaces 212, 214. First major surface 212 has an abrasive coating 216 disposed on only a portion of the porous substrate according to a predetermined pattern 225.

Figure 2A:
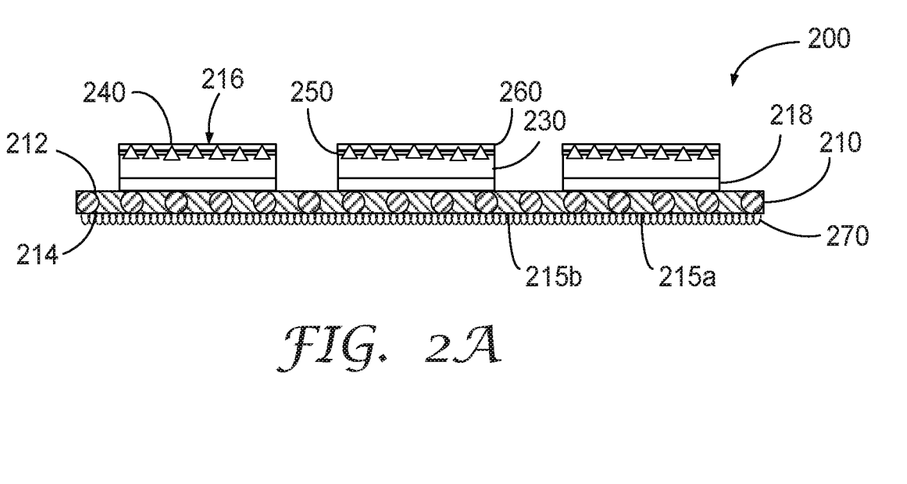
FIG. 2A is a schematic cross-sectional side view of abrasive article 200 along line 2A-2A.
Figure 3:
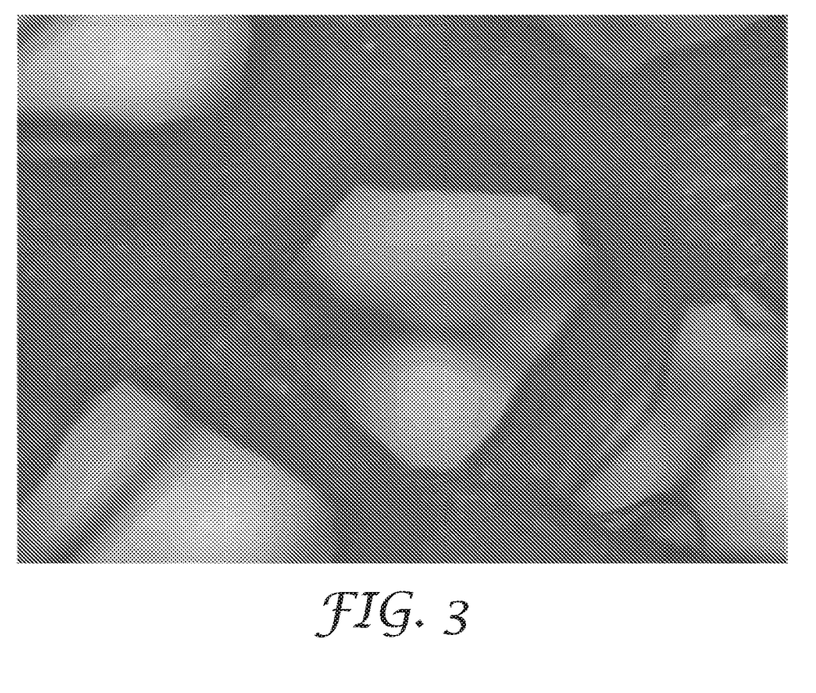
FIG. 3 is a 50× optical micrograph of a portion of the non-loop side of the mesh substrate used in Example 1.
Figure 4:
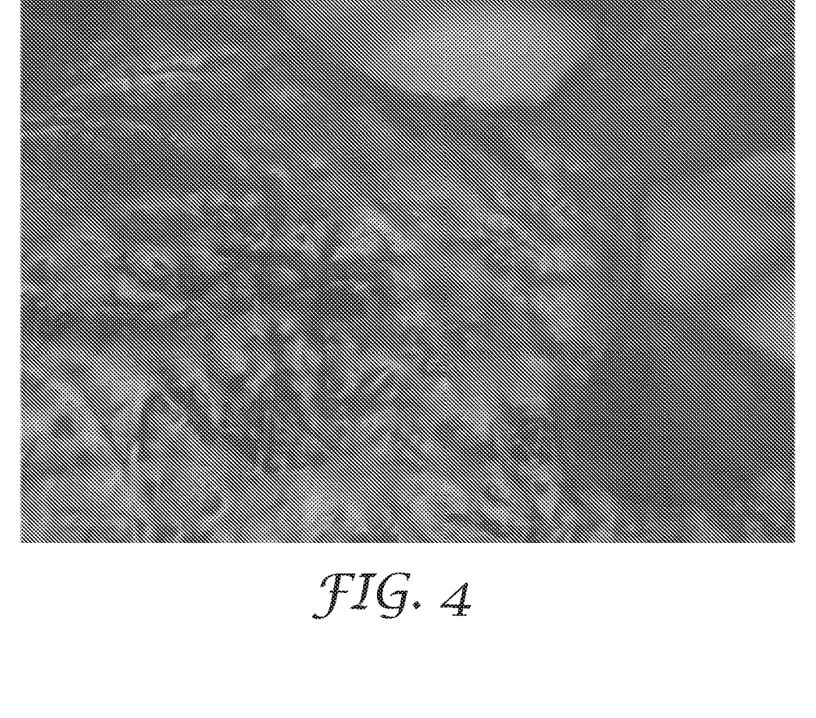
FIG. 4 is a 50× optical micrograph of a pattern edge portion of the pattern coated side of the pattern coated mesh substrate in Example 1
Figure 5:
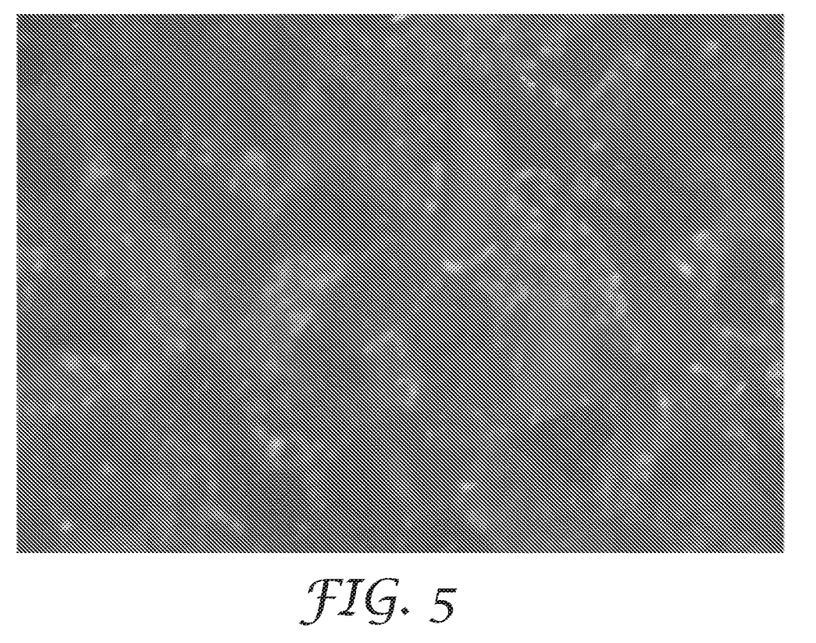
FIG. 5 is a 50× optical micrograph of a portion of the coated side of the abrasive coated mesh substrate in Example 1.
Figure 6:
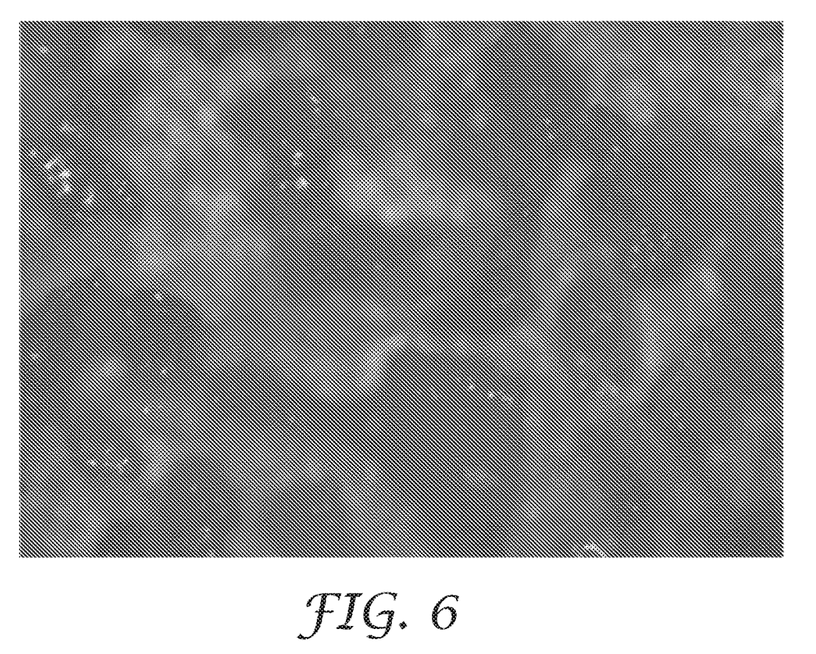
FIG. 6 is a 50× optical micrograph of a portion of the coated side of the abrasive article of Example 1.

As shown in FIG. 2A, porous substrate 210 has a first portion of openings 215a that extend therethrough the abrasive article and are fully occluded by functional layer 218, preventing swarf from passing through those openings. For a second portion of openings 215b, the openings are not fully occluded, thereby allowing swarf to pass through those openings.

The abrasive coating 216 comprises functional layer 218 and make layer 230 which is disposed on the functional layer. Abrasive particles 240 are partially embedded in make layer 230. Size layer 250 overlays make layer 230 and abrasive particles 240. Optional supersize layer 260 overlays size layer 250.

Optional attachment interface layer 270, secured to the second major surface of the porous substrate, comprises one half of a two-part mechanical fastening system, shown as a looped portion of a hook and loop fastening system.

Exemplary porous substrates include knit fabrics (e.g., knit fabrics having a volume porosity of at least 20 percent, at least 30 percent, at least 40 percent, at least 50 percent, at least 60 percent, or even at least 70 percent), open weave fabrics, woven meshes/screens (e.g., wire mesh or fiberglass mesh), porous nonwoven fabrics, unitary meshes (e.g., unitary continuous plastic screens), perforated polymeric films, and perforated nonporous (e.g., sealed) fabrics. In some embodiments, the porous substrate may comprise an integral loop substrate, especially in the case of knit fabrics.

Porous fabric substrates can be made from any known fibers, whether natural, synthetic, or a blend of natural and synthetic fibers. Examples of useful fiber materials include fibers or yarns comprising polyester (e.g., polyethylene terephthalate), polyamide (e.g., hexamethylene adipamide, polycaprolactam), polypropylene, acrylic, cellulose acetate, polyvinylidene chloride-vinyl chloride copolymers, vinyl chloride-acrylonitrile copolymers, graphite, polyimide, silk, cotton, linen, jute, hemp, and/or rayon. Useful fibers may be of virgin materials or of recycled or waste materials reclaimed from garment cuttings, carpet manufacturing, fiber manufacturing, or textile processing, for example. Useful fibers may be homogenous or a composite such as a bicomponent fiber (for example, a co-spun sheath-core fiber). The fibers may be tensilized and crimped, but may also be continuous filaments such as those formed by an extrusion process.

Porous film substrates may comprise perforated polymer films comprising, for example, polyester (e.g., polyethylene terephthalate), polyamide (e.g., hexamethylene adipamide, polycaprolactam), polypropylene, acrylic, cellulose acetate, polyvinylidene chloride-vinyl chloride copolymers, and/or vinyl chloride-acrylonitrile copolymers. Perforation may be provided by die punching, needle punching, knife cutting, laser perforating, and slitting as described in U.S. Pat. No. 9,168,636 (Wald et al.) and U.S. Pat. No. 9,138,031 (Wood et al.), for example. Perforation may also be provided by applying a flame, a heat source, or pressurized fluid, as described in U.S. Patent Application No 2016/0009048 A1 (Slama et al.) and U.S. Pat. No. 7,037,100 (Strobel et al.), for example.

The porous substrate can be rigid, semi-rigid, or flexible. The porous substrate has openings that extend through its body between two opposed major surfaces. The openings may be perforations or spaces between fiber strands of a fabric, for example.

The openings in the porous substrate should be of sufficient size, which may be the same or different, that swarf generated during abrading operations can be drawn by vacuum through the openings and away from the surface of a workpiece being abraded. In some embodiments, the openings are of sufficient size that some or all of them allow passage of swarf particles with an average diameter of less than or equal to 0.01 millimeter (mm), less than or equal to 0.05 mm, less than or equal to 0.1 mm, less than or equal to 0.15 mm, less than or equal to 0.3 mm, less than or equal to 0.5 mm, less than or equal to 1 mm, or even less than or equal to 2 mm through the porous backing.

The porous substrate can have a thickness of at least 0.02 mm, at least 0.03 mm, at least 0.05 mm, at least 0.07 mm, or even at least 0.1 mm, although this is not a requirement. Likewise, the porous substrate may have a thickness of up to 5 mm, up to 4 mm, up to 2.5 mm, up to 1.5 mm, or up to 0.4 mm in any combination with the preceding lower limits, although this is not a requirement.

Generally, the strength of the porous substrate should be sufficient to resist tearing or other damage during abrading processes. The thickness and smoothness of the porous substrate should also be suitable to provide the desired thickness and smoothness of the abrasive article; for example, depending on the intended application or use of the abrasive article.

The porous substrate may have any basis weight; for example, in a range of from 25 to 1000 grams per square meter (gsm), more typically 50 to 600 gsm, and even more typically 100 to 300 gsm. To promote adhesion of the functional layer to the porous substrate, one or more surfaces of the porous substrate may be modified by known methods including corona discharge, ultraviolet light exposure, electron beam exposure, flame discharge, and/or scuffing.

The functional layer is disposed on only a portion of a first major surface of the porous substrate, thereby also allowing for some of the openings in the porous substrate to pass swarf through the abrasive article during abrading. The functional layer comprises a crosslinked binder, that it typically provided by curing a corresponding functional layer precursor comprising a curable (i.e., chemically crosslinkable) resin. Useful binder precursors include thermally-curable resins, moisture curable resins, and radiation curable resins, which may be cured, for example, by exposure to heat, moisture, and/or particulate or electromagnetic radiation Sources of particulate and electromagnetic radiation may include electron beam (e-beam) and ultraviolet and/or visible light.

Examples of suitable curable resins that may be used in the functional layer precursor include, for example, phenolic resins, urea-formaldehyde resins, aminoplast resins, urethane resins, melamine formaldehyde resins, cyanate resins, isocyanurate resins, (meth)acrylate resins (e.g., (meth)acrylated urethanes, (meth)acrylated epoxies, ethylenically-unsaturated free-radically polymerizable compounds, aminoplast derivatives having pendant alpha, beta-unsaturated carbonyl groups, isocyanurate derivatives having at least one pendant acrylate group, and isocyanate derivatives having at least one pendant acrylate group), vinyl ethers, epoxy resins, and combinations thereof. As used herein, the term "(meth)acryl" encompasses acryl and methacryl. Of these, radiation-curable resins are preferred in some embodiments.

Phenolic resins have good thermal properties, availability, and relatively low cost and ease of handling There are two types of phenolic resins, resole and novolac. Resole phenolic resins have a molar ratio of formaldehyde to phenol of greater than or equal to one to one, typically in a range of from 1.5:1.0 to 3.0:1.0. Novolac resins have a molar ratio of formaldehyde to phenol of less than one to one. Examples of commercially available phenolic resins include those known by the trade designations DUREZ and VARCUM from Occidental Chemicals Corp. of Dallas, Texas; RESINOX from Monsanto Co. of Saint Louis, Missouri; and AEROFENE and AROTAP from Ashland Specialty Chemical Co. of Dublin, Ohio.

(Meth)acrylated urethanes include di(meth)acrylate esters of hydroxyl-terminated NCO extended polyesters or polyethers. Examples of commercially available acrylated urethanes include those available as CMD 6600, CMD 8400, and CMD 8805 from Cytec Industries of West Paterson, New Jersey.

(Meth)acrylated epoxies include di(meth)acrylate esters of epoxy resins such as the diacrylate esters of bisphenol A epoxy resin. Examples of commercially available acrylated epoxies include those available as CMD 3500, CMD 3600, and CMD 3700 from Cytec Industries.

Ethylenically-unsaturated free-radically polymerizable compounds include both monomeric and polymeric compounds that contain atoms of carbon, hydrogen, and oxygen, and optionally, nitrogen and the halogens. Oxygen or nitrogen atoms or both are generally present in ether, ester, urethane, amide, and urea groups. Ethylenically-unsaturated free-radically polymerizable compounds typically have a molecular weight of less than about 4,000 grams per mole and are typically esters made from the reaction of compounds containing a single aliphatic hydroxyl group or multiple aliphatic hydroxyl groups and unsaturated carboxylic acids, such as acrylic acid, methacrylic acid, itaconic acid, crotonic acid, isocrotonic acid, maleic acid, and the like. Representative examples of (meth)acrylate resins include methyl methacrylate, ethyl methacrylate styrene, divinylbenzene, vinyl toluene, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol methacrylate, pentaerythritol tetraacrylate and pentaerythritol tetraacrylate. Other ethylenically unsaturated resins include monoallyl, polyallyl, and polymethallyl esters and amides of carboxylic acids, such as diallyl phthalate, diallyl adipate, and N,N-diallyladipamide. Still other nitrogen containing compounds include tris(2-acryloyl-oxyethyl) isocyanurate, 1,3,5-tris(2-methyacryloxyethyp-s-triazine, acrylamide, N-methylacrylamide, N,N-dimethylacrylamide, N-vinylpyrrolidone, and N-vinylpiperidone.

Useful aminoplast resins have at least one pendant alpha, beta-unsaturated carbonyl group per molecule or oligomer. These unsaturated carbonyl groups can be acrylate, methacrylate, or acrylamide type groups. Examples of such materials include N-(hydroxymethyl)acrylamide, N,N'-oxydimethylenebisacrylamide, ortho- and para-acrylamidomethylated phenol, acrylamidomethylated phenolic novolac, and combinations thereof. These materials are further described in U.S. Pat. Nos. 4,903,440 and 5,236,472 (both to Kirk et al.).

Isocyanurate derivatives having at least one pendant acrylate group and isocyanate derivatives having at least one pendant acrylate group are further described in U.S. Pat. No. 4,652,274 (Boettcher et al.). An example of one isocyanurate material is the triacrylate of tris(hydroxyethyl) isocyanurate.

Epoxy resins have one or more epoxy groups that may be polymerized by ring opening of the epoxy group(s). Such epoxy resins include monomeric epoxy resins and oligomeric epoxy resins. Examples of useful epoxy resins include 2,2-bis[4-(2,3-epoxypropoxy)-phenyl propane] (diglycidyl ether of bisphenol) and materials available as EPON 828, EPON 1004, and EPON 1001F from Hexion Inc. of Houston, Texas; and DER-331, DER-332, and DER-334 from Dow Chemical Co. of Midland, Mich. Other suitable epoxy resins include glycidyl ethers of phenol formaldehyde novolac commercially available as DEN-431 and DEN-428 from Dow Chemical Co.

The epoxy resins can polymerize via a cationic mechanism with the addition of an appropriate cationic curing agent. Cationic curing agents generate an acid source to initiate the polymerization of an epoxy resin. These cationic curing agents can include a salt having an onium cation and a halogen containing a complex anion of a metal or metalloid. Other curing agents (e.g., amine hardeners and guanidines) for epoxy resins and phenolic resins may also be used.

Other cationic curing agents include a salt having an organometallic complex cation and a halogen containing complex anion of a metal or metalloid which are further described in U.S. Pat. No. 4,751,138 (Tumey et al.). Another example is an organometallic salt and an onium salt is described in U.S. Pat. No. 4,985,340 (Palazzotto et al.); U.S. Pat. No. 5,086,086 (Brown-Wensley et al.); and U.S. Pat. No. 5,376,428 (Palazzotto et al.). Still other cationic curing agents include an ionic salt of an organometallic complex in which the metal is selected from the elements of Periodic Group IVB, VB, VIB, VIIB and VIIIB which is described in U.S. Pat. No. 5,385,954 (Palazzotto et al.).

Examples of free radical thermal initiators include peroxides, e.g., benzoyl peroxide and azo compounds.

Compounds that generate a free radical source if exposed to actinic electromagnetic radiation are generally termed photoinitiators. Examples of photoinitiators include benzoin and its derivatives such as alpha-methylbenzoin; α-phenylbenzoin; α-allylbenzoin; α-benzylbenzoin; benzoin ethers such as benzil dimethyl ketal (e.g., as commercially available as IRGACURE 651 from BASF, Ludwigshafen, Germany), benzoin methyl ether, benzoin ethyl ether, benzoin n-butyl ether; acetophenone and its derivatives such as 2-hydroxy-2-methyl-1-phenyl-1-propanone (e.g., as DAROCUR 1173 from BASF) and 1-hydroxycyclohexyl phenyl ketone (e.g., as IRGACURE 184 from BASF); 2-methyl-1-[4-(methylthio)phenyl]-2-(4-morpholinyl)-1-propanone (e.g., as IRGACURE 907 from BASF; 2-benzyl-2-(dimethylamino)-1-[4-(4-morpholinyflphenyl]-1-butanone (e.g., as IRGACURE 369 from BASF). Other useful photoinitiators include, for example, pivaloin ethyl ether, anisoin ethyl ether, anthraquinones (e.g., anthraquinone, 2-ethylanthraquinone, 1-chloroanthraquinone, 1,4-dimethylanthraquinone, 1-methoxyanthraquinone, or benzanthmquinone), halomethyltriazines, benzophenone and its derivatives, iodonium salts and sulfonium salts, titanium complexes such as bis(eta.sub.5-2,4-cyclopentadien-1-yl)-bis[2,6-difluoro-3-(1H-pyrrol-1-yl)phenyl]titanium (e.g., as CGI 784DC from BASF); halonitrobenzenes (e.g., 4-bromomethylnitrobenzene), mono- and bis-acylphosphines (e.g., as IRGACURE 1700, IRGACURE 1800, IRGACURE 1850, and DAROCUR 4265 all from BASF). Combinations of photoinitiators may be used. One or more spectral sensitizers (e.g., dyes) may be used in conjunction with the photoinitiator(s), for example, in order to increase sensitivity of the photoinitiator to a specific source of actinic radiation.

To ensure crosslinking/curing of the curable resin, it should typically contain at least one polymerizable monomer that has at least 2, at least 3, or even at least 4 polymerizable groups, although post-treatment (e.g., with ionizing radiation) may be effective at causing crosslinking as well.

The foregoing curable resins may be combined with one or more of a catalyst, an initiator (e.g., a free-radical thermal initiator or free-radical photoinitiator), a synergist, a sensitizer, filler, coupling agents, colorant, or an antioxidant. The amount and selection of any catalysts and/or initiator will vary depending upon the curable resin selected and is within the capabilities of those of ordinary skill in the art. Typically, an amount of less than or equal to 10 percent by weight, preferably 5 percent by weight or less, is sufficient to accomplish curing of the curable resin to a degree sufficient to provide the functional layer.

Thermal curing may be accomplished by heating or exposure to radiofrequency or infrared radiation, while photocuring may be accomplished, for example, by exposure to actinic radiation (e.g., visible and/or ultraviolet electromagnetic radiation).

The functional layer and functional layer precursor may be modified by various additives including, for example, surfactants (e.g., antifoaming agents such as ethoxylated nonionic surfactants such as DYNOL 604), pigments (e.g., carbon black pigment such as C-SERIES BLACK 7 LCD4115), fillers (e.g., silicon dioxide such as CABOSIL M5), synthetic waxes (e.g., synthetic paraffin MP22), stabilizers, plasticizers, tackifiers, flow control agents, cure rate retarders, adhesion promoters (for example, silanes such as (3-glycidoxypropyl)trimethoxysilane (GPTMS), and titanates), adjuvants, impact modifiers, rheology modifiers, expandable microspheres, thermally conductive particles, electrically conductive particles, fillers such as silica, glass, clay, talc, colorants, glass beads and/or bubbles, and antioxidants.

The functional layer can be prepared by pattern coating the functional layer precursor onto the porous substrate and then curing it. Useful pattern coating methods may include, for example, gravure roll coating, spraying, flexographic printing, spray jet printing, stencil printing, slot coating, and inkjet printing. Alternatively, the functional layer can be prepared by pattern coating the functional layer precursor onto a release liner, covering with the porous substrate, at least partially curing the precursor, and then removing the release liner.

Preferably, the functional layer precursor is sufficiently viscous during a pattern coating process that it can occlude openings over which it is coated without significant penetration, at least until it is cured. However, less viscous formulations that penetrate the openings and thereby occlude them may also be used.

In some embodiments, the thickness of the functional layer may be 5 microns to 200 microns, preferably 20 to 200 microns; however this is not a requirement.

The functional layer may be disposed on the porous substrate randomly or according to a predetermined pattern (e.g., dots, a grid, stripes, and/or wavy stripes). The pattern may be contiguous or non-contiguous.

A make layer comprising a crosslinked polymeric material is disposed on at least a portion of, preferably at least substantially all of the functional layer opposite the porous substrate.

In embodiments shown in FIGS. 1 and 1A, the abrasive particles are dispersed throughout a make layer. In embodiments shown in FIGS. 2 and 2A, the abrasive particles are partially embedded in the make layer.

The make layer comprises a second crosslinked binder composition and is typically prepared by at least partially curing a curable make layer precursor, which may be the same as or different than the functional layer precursor.

In preferred embodiments, the make layer precursor comprises a phenolic resin (e.g., PREFERE 80 5077A from Arclin, Mississauga, Ontario, Canada) Suitable phenolic resins are generally formed by condensation of phenol or an alkylated phenol (e.g., cresol) and formaldehyde, and are usually categorized as resole or novolac phenolic resins. Novolac phenolic resins are acid-catalyzed and have a molar ratio of formaldehyde to phenol of less than 1:1. Resole (also resol) phenolic resins can be catalyzed by alkaline catalysts, and the molar ratio of formaldehyde to phenol is greater than or equal to one, typically between 1.0 and 3.0, thus presenting pendant methylol groups Alkaline catalysts suitable for catalyzing the reaction between aldehyde and phenolic components of resole phenolic resins include sodium hydroxide, barium hydroxide, potassium hydroxide, calcium hydroxide, organic amines, and sodium carbonate, all as solutions of the catalyst dissolved in water.

Resole phenolic resins are typically coated as a solution with water and/or organic solvent (e.g., alcohol). Typically, the solution includes about 70 percent to about 85 percent solids by weight, although other concentrations may be used. If the solids content is very low, then more energy is required to remove the water and/or solvent. If the solids content is very high, then the viscosity of the resulting phenolic resin is too high which typically leads to processing problems.

Phenolic resins are well-known and readily available from commercial sources. Examples of commercially available resole phenolic resins useful in practice of the present disclosure include those marketed by Durez Corporation under the trade designation VARCUM (e.g., 29217, 29306, 29318, 29338, 29353); those marketed by Ashland Chemical Co. of Bartow, Florida under the trade designation AEROFENE (e.g., AEROFENE 295); and those marketed by Kangnam Chemical Company Ltd. of Seoul, South Korea under the trade designation PHENOLITE (e.g., PHENOLITE TD-2207).

The make layer precursor can comprise additional components, including polyurethane dispersions such as aliphatic and/or aromatic polyurethane dispersions. For example, polyurethane dispersions can comprise a polycarbonate polyurethane, a polyester polyurethane, or polyether polyurethane. The polyurethane can comprise a homopolymer or a copolymer.

Examples of commercially available polyurethane dispersions include aqueous aliphatic polyurethane emulsions available as NEOREZ R-960, NEOREZ R-966, NEOREZ R-967, NEOREZ R-9036, and NEOREZ R-9699 from DSM Neo Resins, Inc., Wilmington, Massachusetts; aqueous anionic polyurethane dispersions available as ESSENTIAL CC4520, ESSENTIAL CC4560, ESSENTIAL R4100, and ESSENTIAL R4188 from Essential Industries, Inc., Merton, Wisconsin; polyester polyurethane dispersions available as SANCURE 843, SANCURE 898, and SANCURE 12929 from Lubrizol, Inc. of Cleveland, Ohio; an aqueous aliphatic self-crosslinking polyurethane dispersion available as TURBOSET 2025 from Lubrizol, Inc.; and an aqueous anionic, co-solvent free, aliphatic self-crosslinking polyurethane dispersion, available as BAYHYDROL PR240 from Bayer Material Science, LLC of Pittsburgh, Pennsylvania.

Additional suitable commercially available aqueous polyurethane dispersions include:
1) Alberdingk U 6150, a solvent-free, aliphatic polycarbonate polyurethane dispersion available from Alberdingk Boley GmbH, Krefeld, Germany, having a viscosity ranging from 50-500 mPa·s (according to ISO 1652, Brookfield RVT Spindle 1/rpm 20/factor 5), an elongation at break of about 200%, and a Koenig hardness after curing of about 65-70 s;
2) Alberdingk U 6800, an aqueous, solvent-free, colloidal, low viscosity dispersion of an aliphatic polycarbonate polyurethane without free isocyanate groups available from Alberdingk Boley GmbH, Krefeld, Germany, having a viscosity ranging from 20-200 mPa·s (according to ISO 2555, Brookfield RVT Spindle 1/rpm 50/factor 2), an elongation at break of about 500%, and a Koenig hardness after curing of about 45 seconds;
3) Alberdingk U 6100, an aqueous, colloidal, anionic, low viscosity dispersion of an aliphatic polyester-polyurethane without free isocyanate groups available from Alberdingk Boley GmbH, Krefeld, Germany, having a viscosity of 20-200 mPa·s (according to ISO 1652, Brookfield RVT Spindle 1/rpm 50 factor 2), an elongation at break of about 300%, and a Koenig hardness after curing of about 50 s;
4) Alberdingk U9800—a solvent-free aliphatic polyester polyurethane dispersion available from Alberdingk Boley GmbH, Krefeld, Germany having a viscosity of 20-200 mPa·s (according to ISO 1652, Brookfield RVT Spindle 1/rpm 20/factor 5), and elongation at break of about 20-50%, and a Koenig hardness after curing of about 100-130 s; and
5) Adiprene BL16—a liquid urethane elastomer with blocked isocyanate curing sites available from Chemtura, Middlebury, Connecticut.

Optional additives for polyurethane dispersions, as well as for curable compositions in general, include rheological modifiers, anti-foaming agents, water-based latexes and crosslinkers may be added to the aqueous polyurethane dispersion. Suitable crosslinkers include, for example, polyfunctional aziridine, methoxymethylolated melamine, urea resin, carbodiimide, polyisocyanate and blocked isocyanate. Additional water may also be added to dilute the formulation of the aqueous polyurethane dispersion, the phenolic resin, or combinations thereof. Curable compositions can be made, for example, from an aqueous polyurethane dispersion and a water-based latex.

The aqueous polyurethane dispersion may contain less than 20%, less than 10%, less than 5%, or less than 2% organic solvent. In a specific embodiment, the aqueous polyurethane dispersion is substantially free of organic solvent. In some embodiments, it has been found that the aqueous polyurethane dispersion comprises at least about 7%, 15%, or 20% solids, and no greater than about 50% or 60% solids. The aqueous polyurethane dispersion may comprise no greater than about 80%, 85%, or 93% water.

In some embodiments, it has been found that the aqueous polyurethane dispersion forms a film having a Koenig hardness of at least about 30 and no greater than about 200 seconds when measured according to ASTM 4366-16. Further, in some embodiments, it has been found that the aqueous polyurethane dispersion may have a surface tension that is at least about 50% of the surface tension of water and no greater than about 300% of the surface tension of water. And in some embodiments, the aqueous polyurethane dispersion may have a viscosity of at least about 10 mPa s to no greater than about 600 mPa s, or at least about 70%, 80% or 90% of the viscosity of water and no greater than about 600%, 500% or 400% of the viscosity of water.

In addition, in some embodiments, the aqueous polyurethane dispersion may comprise at least about 100, 1000, or even at least about 10000 parts per million (ppm) of dimethylolpropionic acid. Optional additives including rheological modifiers, anti-foaming agents, and crosslinkers may be added to the aqueous polyurethane dispersion, for example. Suitable crosslinkers include, for example, polyfunctional aziridine, methoxymethylolated melamine, urea resin, carbodiimide, polyisocyanate and blocked isocyanate. Additional water may be added to reduce viscosity of the aqueous polyurethane dispersion. Likewise, addition of up to 10 percent by weight of organic solvent (e.g., propyl methyl ether or isopropanol) to the aqueous polyurethane dispersion may be used to reduce viscosity and/or improve the miscibility of ingredients.

The dispersed polyurethane can include at least one polycarbonate segment, although this is not a requirement.

The phenolic resin and aqueous polyurethane dispersion components are mixed in a solids weight ratio of 91 to 99 percent by weight phenolic resin to 9 to 1 percent by weight of polyurethane. In some embodiments, the phenolic resin and aqueous polyurethane dispersion components are mixed in a solids weight ratio of 56 to 91 percent by weight phenolic resin to 44 to 9 percent by weight of polyurethane. In some embodiments, the phenolic resin and aqueous polyurethane dispersion components are mixed in a solids weight ratio of 62 to 91 percent by weight phenolic resin to 38 to 9 percent by weight of polyurethane. In some embodiments, the phenolic resin and aqueous polyurethane dispersion components are mixed in a solids weight ratio of 69 to 91 percent by weight phenolic resin to 31 to 9 percent by weight of polyurethane. In some embodiments, the phenolic resin and aqueous polyurethane dispersion components are mixed in a solids weight ratio of 56 to 83 percent by weight phenolic resin to 44 to 17 percent by weight of polyurethane. In some embodiments, the phenolic resin and aqueous polyurethane dispersion components are mixed in a solids weight ratio of 56 to 76 percent by weight phenolic resin to 44 to 24 percent by weight of polyurethane. In some embodiments, the phenolic resin and aqueous polyurethane dispersion components are mixed in a solids weight ratio of 56 to 69 percent by weight phenolic resin to 44 to 31 percent by weight of polyurethane.

In some embodiments, of the type shown in FIG. 1 the make layer may be a structured abrasive layer comprising a plurality of shaped (e.g., precisely-shaped) abrasive composites. In such embodiments, the make layer preferably comprises a photocured crosslinked acrylic polymer, although any crosslinked polymeric binder material can be used. Details concerning photocurable acrylic monomers are discussed hereinabove. Details concerning the molding and curing steps involved in making structured abrasive composites can be found, for example, in U.S. Pat. No. 5,152,917 (Pieper et al.) and U.S. Pat. Appln. Publ. No. 2011/0065362 A1 (Woo et al.).

Useful abrasive particles may be the result of a crushing operation (e.g., crushed abrasive particles that have been sorted for shape and size) or the result of a shaping operation (i.e., shaped abrasive particles) in which an abrasive precursor material is shaped (e.g., molded), dried, and converted to ceramic material. Combinations of abrasive particles resulting from crushing with abrasive particles resulting from a shaping operation may also be used. The abrasive particles may be in the form of, for example, individual particles, agglomerates, composite particles, and mixtures thereof.

The abrasive particles should have sufficient hardness and surface roughness to function as crushed abrasive particles in abrading processes. Preferably, the abrasive particles have a Mohs hardness of at least 4, at least 5, at least 6, at least 7, or even at least 8.

Suitable abrasive particles include, for example, crushed abrasive particles comprising fused aluminum oxide, heat-treated aluminum oxide, white fused aluminum oxide, ceramic aluminum oxide materials such as those commercially available as 3M CERAMIC ABRASIVE GRAIN from 3M Company, St. Paul, Minnesota, brown aluminum oxide, blue aluminum oxide, silicon carbide (including green silicon carbide), titanium diboride, boron carbide, tungsten carbide, garnet, titanium carbide, diamond, cubic boron nitride, garnet, fused alumina zirconia, iron oxide, chromia, zirconia, titania, tin oxide, quartz, feldspar, flint, emery, sol-gel-derived ceramic (e.g., alpha alumina), and combinations thereof. Examples of sol-gel-derived abrasive particles from which the abrasive particles can be isolated, and methods for their preparation can be found, in U.S. Pat. No. 4,314,827 (Leitheiser et al.); U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). It is also contemplated that the abrasive particles could comprise abrasive agglomerates such, for example, as those described in U.S. Pat. No. 4,652,275 (Bloecher et al.) or U.S. Pat. No. 4,799,939 (Bloecher et al.). In some embodiments, the abrasive particles may be surface-treated with a coupling agent (e.g., an organosilane coupling agent) or other physical treatment (e.g., iron oxide or titanium oxide) to enhance adhesion of the crushed abrasive particles to the binder. The abrasive particles may be treated before combining them with the binder, or they may be surface treated in situ by including a coupling agent to the binder.

Preferably, the abrasive particles (and especially the abrasive particles) comprise ceramic abrasive particles such as, for example, sol-gel-derived polycrystalline alpha alumina particles. Ceramic abrasive particles composed of crystallites of alpha alumina, magnesium alumina spinel, and a rare earth hexagonal aluminate may be prepared using sol-gel precursor alpha alumina particles according to methods described in, for example, U.S. Pat. No. 5,213,591 (Celikkaya et al.) and U.S. Publ. Pat. Appln. Nos. 2009/0165394 A1 (Culler et al.) and 2009/0169816 A1 (Erickson et al.). Further details concerning methods of making sol-gel-derived abrasive particles can be found in, for example, U.S. Pat. No. 4,314,827 (Leitheiser); U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.); and in U.S. Publ. Pat. Appln. No. 2009/0165394 A1 (Culler et al.).

In some preferred embodiments, useful abrasive particles (especially in the case of the abrasive particles) may be shaped abrasive particles can be found in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina abrasive particles that have been formed in a specific shape, then crushed to form shards that retain a portion of their original shape features. In some embodiments, the abrasive particles are precisely-shaped (i.e., the particles have shapes that are at least partially determined by the shapes of cavities in a production tool used to make them. Details concerning such abrasive particles and methods for their preparation can be found, for example, in U.S. Pat. No. 8,142,531 (Adefris et al.); U.S. Pat. No. 8,142,891 (Culler et al.); U.S. Pat. No. 8,142,532 (Erickson et al.); U.S. Pat. No. 9,771,504 (Adefris); and in U.S. Pat. Appl. Publ. Nos. 2012/0227333 (Adefris et al.); 2013/0040537 (Schwabel et al.); and 2013/0125477 (Adefris). One particularly useful precisely-shaped abrasive particle shape is that of a platelet having three-sidewalls, any of which may be straight or concave, and which may be vertical or sloping with respect to the platelet base; for example, as set forth in the above cited references.

Surface coatings on the abrasive particles may be used to improve the adhesion between the abrasive particles and a binder material, or to aid in electrostatic deposition of the abrasive particles. In one embodiment, surface coatings as described in U.S. Pat. No. 5,352,254 (Celikkaya) in an amount of 0.1 to 2 percent surface coating to abrasive particle weight may be used. Such surface coatings are described in U.S. Pat. No. 5,213,591 (Celikkaya et al.); U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 5,085,671 (Martin et al.); U.S. Pat. No. 4,997,461 (Markhoff-Matheny et al.); and U.S. Pat. No. 5,042,991 (Kunz et al.). Additionally, the surface coating may prevent shaped abrasive particles from capping. Capping is the term to describe the phenomenon where metal particles from the workpiece being abraded become welded to the tops of the abrasive particles. Surface coatings to perform the above functions are known to those of skill in the art.

In some embodiments, the abrasive particles may be selected to have a length and/or width in a range of from 0.1 micrometers to 3.5 millimeters (mm), more typically 0.05 mm to 3.0 mm, and more typically 0.1 mm to 2.6 mm, although other lengths and widths may also be used.

The abrasive particles may be selected to have a thickness in a range of from 0.1 micrometer to 1.6 mm, more typically from 1 micrometer to 1.2 mm, although other thicknesses may be used. In some embodiments, abrasive particles may have an aspect ratio (length to thickness) of at least 2, 3, 4, 5, 6, or more.

Abrasive particles may be independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard) Such industry accepted grading standards include, for example: ANSI 4, ANSI 6, ANSI 8, ANSI 16, ANSI 24, ANSI 30, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600; FEPA P8, FEPA P12, FEPA P16, FEPA P24, FEPA P30, FEPA P36, FEPA P40, FEPA P50, FEPA P60, FEPA P80, FEPA P100, FEPA P120, FEPA P150, FEPA P180, FEPA P220, FEPA P320, FEPA P400, FEPA P500, FEPA P600, FEPA P800, FEPA P1000, FEPA P1200; FEPA F8, FEPA F12, FEPA F16, and FEPA F24; and JIS 8, JIS 12, JIS 16, JIS 24, JIS 36, JIS 46, JIS 54, JIS 60, JIS 80, JIS 100, JIS 150, JIS 180, JIS 220, JIS 240, JIS 280, JIS 320, JIS 360, JIS 400, JIS 600, JIS 800, JIS 1000, JIS 1500, JIS 2500, JIS 4000, JIS 6000, JIS 8000, and JIS 10,000. More typically, the crushed aluminum oxide particles and the non-seeded sol-gel derived alumina-based abrasive particles are independently sized to ANSI 60 and 80, or FEPA F36, F46, F54 and F60 or FEPA P60 and P80 grading standards.

Alternatively, the abrasive particles can be graded to a nominal screened grade using U.S.A Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according to a designated particle size. A typical designation may be represented as −18+20 meaning that the shaped abrasive particles pass through a test sieve meeting ASTM E-11 specification for the number 18 sieve and are retained on a test sieve meeting ASTM E-11 specification for the number 20 sieve. In one embodiment, the shaped abrasive particles have a particle size such that most of the particles pass through an 18 mesh test sieve and can be retained on a 20, 25, 30, 35, 40, 45, or 50 mesh test sieve. In various embodiments, the shaped abrasive particles can have a nominal screened grade comprising: −18+20, −20+25, −25+30, −30+35, −35+40, −40+45, −45+50, −50+60, −60+70, −70+80, −80+100, −100+120, −120+140, −140+170, −170+200, −200+230, −230+270, −270+325, −325+400, −400+450, −450+500, or −500+635.

Alternatively, a custom mesh size could be used such as −90+100.

The abrasive particles can optionally be oriented by influence of a magnetic field prior to the make layer precursor being cured. See, for example, commonly-owned PCT Pub. Nos. WO 2018/080703, WO 2018/080756, WO 2018/080704, WO 2018/080705, WO 2018/080765, WO 2018/080784, WO 2018/136271, WO 2018/134732, WO 2018/080755, WO 2018/080799, WO 2018/136269, and WO 2018/136268.

In some embodiments, the abrasive particles can optionally be placed using tools for controlled orientation and placement of abrasive particles. See, for example, commonly-owned PCT Pub. Nos. WO 2012/112305, WO 2015/100020, WO 2015/100220, WO 2015/100018, WO 2016/028683, WO 2016/089675, WO 2018/063962, WO 2018/063960, WO 2018/063958, WO 2019/102312, WO 2019/102328, WO 2019/102329, WO 2019/102330, WO 2019/102331, WO 2019/102332, WO 2016/205133, WO 2016/205267, WO 2017/007714, WO 2017/007703, WO 2018/118690, WO 2018/118699, WO 2018/118688, U.S. Pat. Pub. No. 2019/0275641, and U.S. Provisional Pat. Appl. Nos. 62/751,097, 62/767,853, 62/767,888, 62/780,987, 62/780,988, 62/780,994, 62/780,998, 62/781,009, 62/781,021, 62/781,037, 62/781,043, 62/781,057, 62/781,072, 62/781,077, 62/781,082, 62/825,938, and 62/781,103.

In embodiments shown in FIGS. 2 and 2A, a size layer comprising a crosslinked polymeric binder is disposed on at least a portion of, preferably at least substantially all of the make layer opposite the functional layer. While it is permissible for minimal amounts of the size layer to extend beyond the make layer, it is preferred that the size layer resides substantially completely on the make layer and abrasive particles.

The size layer can be prepared in the same manner from a size layer precursor comprising any of the foregoing curable materials in the make and/or functional layer, which may be the same as or different from the size layer. In preferred embodiments the size layer comprises a cured phenolic resin; e.g., as described hereinabove. The size layer precursor may be applied to the make layer and cured to form the size layer by any suitable technique, including those used for applying and curing the make layer precursor and/or the functional layer precursor.

In addition to other components, the make and size layers and their precursors may further contain optional additives, for example, to modify performance and/or appearance. Exemplary additives include grinding aids, fillers, plasticizers, wetting agents, surfactants, pigments, coupling agents, fibers, lubricants, thixotropic materials, antistatic agents, suspending agents, and/or dyes.

Exemplary grinding aids, which may be organic or inorganic, include waxes, halogenated organic compounds such as chlorinated waxes like tetrachloronaphthalene, pentachloronaphthalene, and polyvinyl chloride; halide salts such as sodium chloride, potassium cryolite, sodium cryolite, ammonium cryolite, potassium tetrafluoroborate, sodium tetrafluoroborate, silicon fluorides, potassium chloride, magnesium chloride; and metals and their alloys such as tin, lead, bismuth, cobalt, antimony, cadmium, iron, and titanium. Examples of other grinding aids include sulfur, organic sulfur compounds, graphite, and metallic sulfides. A combination of different grinding aids can be used. Exemplary antistatic agents include electrically conductive material such as vanadium pentoxide (e.g., dispersed in a sulfonated polyester), humectants, carbon black and/or graphite in a binder.

Examples of useful fillers for this disclosure include silica such as quartz, glass beads, glass bubbles and glass fibers; silicates such as talc, clays, (montmorillonite) feldspar, mica, calcium silicate, calcium metasilicate, sodium aluminosilicate, sodium silicate; metal sulfates such as calcium sulfate, barium sulfate, sodium sulfate, aluminum sodium sulfate, aluminum sulfate; gypsum; vermiculite; wood flour; aluminum trihydrate; carbon black; aluminum oxide; titanium dioxide; cryolite; chiolite; and metal sulfites such as calcium sulfite.

The abrasive article may optionally also include a supersize layer. In general, the supersize layer is the outermost coating of the abrasive article and directly contacts the workpiece during an abrading operation. It may be disposed on the size layer, the make layer if there is no size layer, and uncoated portions of the porous substrate, for example. The optional supersize layer may serve to prevent or reduce the accumulation of swarf (the material abraded from a workpiece) between abrasive particles, which can dramatically reduce the cutting ability of the coated abrasive disc. Useful supersize layers typically include a grinding aid (e.g., potassium tetrafluoroborate), metal salts of fatty acids (e.g., zinc stearate or calcium stearate), salts of phosphate esters (e.g., potassium behenyl phosphate), phosphate esters, urea-formaldehyde resins, mineral oils, crosslinked silanes, crosslinked silicones, and/or fluorochemicals. Useful supersize materials are further described, for example, in U.S. Pat. No. 5,556,437 (Lee et al.). Typically, the amount of grinding aid incorporated into coated abrasive articles is about 50 to about 400 gsm, more typically about 80 to about 300 gsm. The supersize may contain a binder such as for example, those used to prepare the size or make layer, but it need not have any binder.

To facilitate good swarf removal, abrasive articles according to the present disclosure may allow for an air flow through the abrasive article at a rate of, e.g., at least 0.1 L/s (e.g. at least 0.2 L/s, at least 0.4 L/s, at least 0.6 L/s, at least 1 L/s; or about 0.1 L/s to about 1 L/s, about 0.25 L/s to about 0.75 L/s, about 0.5 L/s to about 1 L/s, about 1 L/s to about 2 L/s, about 1.5 L/s or about 3 L/s), such that, when in use and attached to a vacuum source (e.g., less than or equal to 40 torr (5.3 kPa)), dust can be removed from an abraded surface through the abrasive article.

Objects and advantages of this disclosure are further illustrated by the following non-limiting examples, but the particular materials and amounts thereof recited in these examples, as well as other conditions and details, should not be construed to unduly limit this disclosure.

EXAMPLES

Objects and advantages of this disclosure are further illustrated by the following non-limiting examples. The particular materials and amounts thereof recited in these examples as well as other conditions and details, should not be construed to unduly limit this disclosure. Unless otherwise noted, all parts, percentages, ratios, etc. in the Examples and the rest of the specification are on weight basis.

Example 1

A 50 by 30 cm stencil of 5 mils (127 microns) thick polyester film was made with a continuous wavy pattern which was 3 mm wide, spaced 4 mm apart, with a wavelength of 21 mm, and an amplitude of 4.9 mm. The wavy pattern was cut into the polyester film by VLS6 75W CO2 laser (obtained from Universal Laser Systems Inc., Scottsdale, Arizona). The stencil was fixed on top of a release liner (commercially available as Silicone Secondary Release Liner 4999 from 3M Company, Saint Paul, Minnesota) by taping the top ends together. A chemically crosslinkable functional layer composition was prepared by mixing the components as shown in Table 1, below, in a black 16-ounce (0.48 liter) container using a spatula at room temperature for 5 minutes.

TABLE 1

| COMPONENT | PERCENT BY WEIGHT OF TOTAL COMPOSITION | SOURCE | DESCRIPTION |
| --- | --- | --- | --- |
| CN963A80 | 78.7 | Sartomer USA, Exton, Pennsylvania | aliphatic polyester-based urethane diacrylate oligomer blended with 20% tripropylene glycol diacrylate |
| SR-339 | 20.3 | Sartomer USA | 2-phenoxyethyl acrylate |
| OMNICURE TPO-L | 1.0 | IGM Resins USA, Charlotte, North Carolina | photoinitiator, 2,4,6-trimethyl-benzoylphenyl phosphinate |

The composition was applied on top of the stencil and forced through by hand using a urethane squeegee. The stencil was then removed, leaving a wavy pattern coating of the functional layer composition on the release liner. The pattern coating was then covered by the non-loop side of a mesh substrate (a GR150 H100 polyester/polyamide net backing available as Net Mesh from SitiP, S.p.A., Cene, Italy) to form a laminate. The laminate was cured by passing once through a UV processor (available from American Ultraviolet Company, Murray Hill, New Jersey) using two V-bulbs in sequence operating at 400 W/inch$^2$ (157.5 W/cm$^2$) and a web speed of 30 ft/min (9.1 m/min), with a distance of 2 inches (5.1 cm) between the bulbs and the laminate. The release liner was then removed to obtain a pattern coated mesh substrate.

A coating composition was prepared by mixing the components as shown in Table 2 in a 16-ounce (0.48 liter) container by a spatula at room temperature for 5 minutes, followed by addition of water to reach a viscosity of approximately 2200 cps (millipascal-second).

TABLE 2

| COMPONENT | PERCENT BY WEIGHT OF TOTAL COMPOSITION | SOURCE | DESCRIPTION |
| --- | --- | --- | --- |
| GP8339 R23155B Phenolic Resin | 47.5 | Georgia-Pacific Chemicals, Atlanta, Georgia | Resole phenolic resin |
| Q325 calcium carbonate powder | 47.5 | Huber Carbonates, Atlanta, Georgia | Calcium carbonate powder |
| GS1450 green pigment | 5 | Heucotech LTD, Fairless Hills, Pennsylvania | Green pigment |

The coating composition was applied to the pattern coated mesh substrate via a kiss coating operation using a 2-roll coater at about 9 m/min speed. In the kiss coating operation, the pattern coated mesh substrate was passed through the nip between a steel top roll (pressed against the uncoated side of the pattern coated mesh substrate) and a 30 Shore A durometer silicone rubber bottom roll that was partially immersed in the coating composition in a dip pan. A doctor blade was used to remove excess coating composition from the bottom roll before contacting with the pattern coated mesh substrate. This kiss coating operation produced a make coat coated mesh substrate.

An 80+ mineral blend was prepared by blending 90% by weight of P80 (an 80 grade aluminum oxide mineral, obtained under the trade name "BFRPL" from Treibacher Industrie AG, Althofen, Austria) with 10% by weight of 80+ precision shaped grain mineral (obtained as Cubitron II from 3M Company). The 80+ mineral blend was evenly spread over a 14 inch by 20 inch (35.6 by 50.8 cm) plastic mineral tray to form a mineral bed. The mineral tray was inserted onto the positive terminal of a direct current (DC) power supply of an electrostatic mineral coater. The make coat coated mesh substrate, in contact with the negative terminal of the mineral coater, was suspended (with coating surface exposed) one inch (25.4 mm) above the mineral bed. The mineral was electrostatically transferred to the coating surface by applying 2025 kilovolts DC across the metal plate and make coat coated mesh substrate. The coated mesh substrate was then partially cured in a 200° F. (93° C.) oven for 30 minutes to produce an abrasive coated mesh substrate.

The abrasive coated mesh substrate was then coated again with the coating composition using the kiss coating operation as described above. The coated mesh substrate was finally cured in a 230° F. (110° C.) oven for 2 hours to make Example 1.

As shown by optical microscope photographs in FIGS. 3-6, the chemically crosslinked pattern coated function layer covered a portion of the openings of the mesh substrate, and the subsequent make coat, abrasive particles, and size coat were disposed on top of the pattern coated functional layer.

Example 2

Example 2 was prepared following the same process as described in Example 1, except using a stencil with a regular repeating square array pattern measuring 4 mm wide, 4 mm high, with 6 mm spacing. The chemically crosslinked pattern coated function layer covered a portion of the openings of the mesh substrate, so that the subsequent make coat, abrasive particles, and size coat were disposed on top of the pattern coated functional layer.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An abrasive article comprising:
   a porous substrate having openings extending through the porous substrate between first and second opposed major surfaces;
   an abrasive coating disposed on only a portion of a first major surface of the porous substrate, wherein the abrasive coating comprises:
   a functional layer disposed on only a portion of a first major surface of the porous substrate, wherein the functional layer comprises a first chemically crosslinked binder, wherein the functional layer is non-contiguous, and wherein the functional layer fully occludes a first portion of the openings and does not fully occlude a second portion of the openings;
   a make layer disposed on at least a portion of the functional layer opposite the porous substrate, wherein the make layer comprises a second chemically crosslinked binder composition; and
   abrasive particles dispersed in or partially embedded in the make layer,
   wherein the second portion of the openings permits passage of abraded swarf through the abrasive article.

2. The abrasive article of claim 1, wherein the porous substrate comprises an open weave fabric.

3. The abrasive article of claim 1, wherein the porous substrate comprises a knit fabric having a volume porosity of at least 20 percent.

4. The abrasive article of claim 1, wherein the porous substrate comprises a wire screen.

5. The abrasive article of claim 1, wherein the porous substrate comprises a perforated polymeric film.

6. The abrasive article of claim 1, wherein the first chemically crosslinked binder comprises a crosslinked acrylic polymer.

7. The abrasive article of claim 1, wherein the second chemically crosslinked binder composition comprises a phenolic resin.

8. The abrasive article of claim 1, wherein the abrasive particles are partially embedded in the make layer, and further comprising a size layer disposed on at least a portion of the make layer, wherein the size layer comprises a third crosslinked binder composition.

9. The abrasive article of claim 8, wherein the third crosslinked binder composition comprises a phenolic resin.

10. The abrasive article of claim 1, further comprising one part of a two-part hook and loop attachment system secured to the porous substrate opposite the functional layer.

11. The abrasive article of claim 1, wherein the functional layer is disposed in a pattern.

12. The abrasive article of claim 11, wherein the pattern comprises dots, a grid, stripes, wavy stripes, or a combination thereof.

13. A method of making an abrasive article, the method comprising:
   providing a porous substrate having openings extending through the porous substrate between first and second opposed major surfaces;
   disposing a crosslinkable functional layer precursor on the first major surface of the porous substrate, wherein the crosslinkable functional layer precursor fully occludes a first portion of the openings and does not fully occlude a second portion of the openings;
   crosslinking the crosslinkable functional layer precursor to provide a crosslinked functional layer, wherein the crosslinked functional layer is non-contiguous;
   disposing a curable make layer precursor on at least a portion of the crosslinked functional layer opposite the porous substrate, wherein the curable make layer precursor has abrasive particles dispersed therein;
   and at least partially curing the curable make layer precursor,
   wherein the second portion of the openings permits passage of abraded swarf through the abrasive article.

14. The method of claim 13, wherein disposing the crosslinkable functional layer precursor on the first major surface of the porous substrate comprises pattern coating the crosslinkable functional layer precursor on the first major surface of the porous substrate.

15. The method of claim 13, wherein disposing the crosslinkable functional layer precursor on the first major surface of the porous substrate comprises pattern coating the crosslinkable functional layer precursor onto a release liner and then covering the crosslinkable functional layer precursor with the porous substrate.

16. The method of claim 13, wherein crosslinking the crosslinkable functional layer precursor to provide the crosslinked functional layer comprises exposing the crosslinkable functional layer precursor to actinic radiation.

17. A method of making an abrasive article, the method comprising:
   providing a porous substrate having openings extending through the porous substrate between first and second opposed major surfaces;
   disposing a crosslinkable functional layer precursor on the first major surface of the porous substrate, wherein the crosslinkable functional layer precursor fully occludes a first portion of the openings and does not fully occlude a second portion of the openings;
   crosslinking the crosslinkable functional layer precursor to provide a crosslinked functional layer, wherein the crosslinked functional layer is non-contiguous;
   disposing a curable make layer precursor on at least a portion of the crosslinked functional layer opposite the porous substrate;
   partially embedding abrasive particles in the curable make layer precursor;
   at least partially curing the curable make layer precursor to provide a make layer;
   disposing a curable size layer precursor over at least a portion of the make layer and the abrasive particles; and
   at least partially curing the curable size layer precursor to provide the abrasive article,
   wherein the second portion of the openings permits passage of abraded swarf through the abrasive article.

18. The method of claim 17, wherein disposing the crosslinkable functional layer precursor on the first major surface of the porous substrate comprises pattern coating the crosslinkable functional layer precursor on the first major surface of the porous substrate.

19. The method of claim 17, wherein disposing the crosslinkable functional layer precursor on the first major surface of the porous substrate comprises pattern coating the crosslinkable functional layer precursor onto a release liner and then covering the crosslinkable functional layer precursor with the porous substrate.

20. The method of claim 17, wherein crosslinking the crosslinkable functional layer precursor to provide the crosslinked functional layer comprises exposing the crosslinkable functional layer precursor to actinic radiation.

* * * * *